(No Model.) 2 Sheets—Sheet 1.
H. MAYER & C. G. F. WAHLE.
DISINFECTING APPARATUS.
No. 575,365. Patented Jan. 19, 1897.
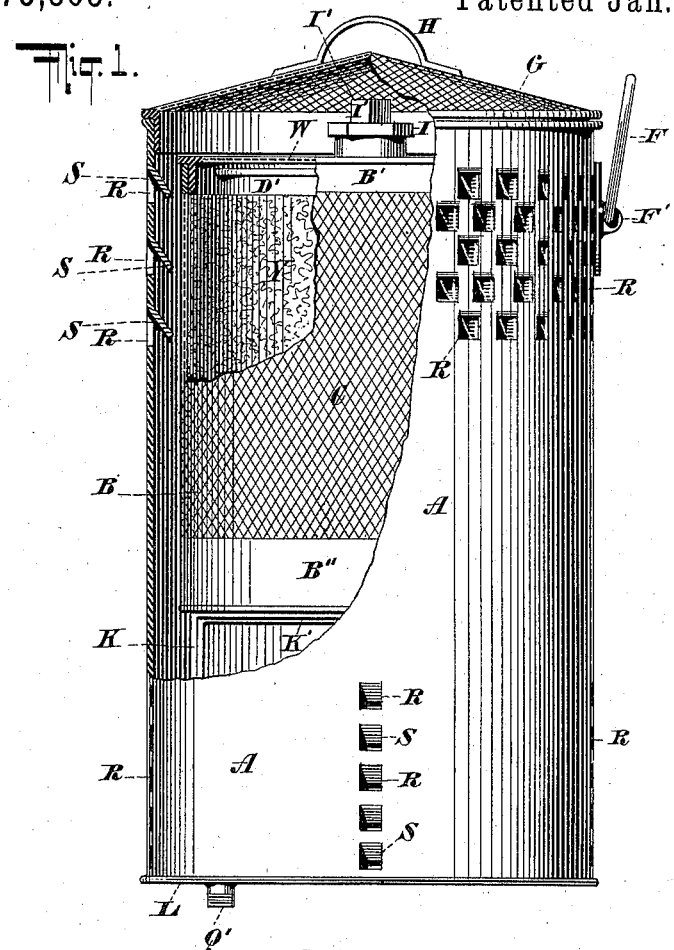
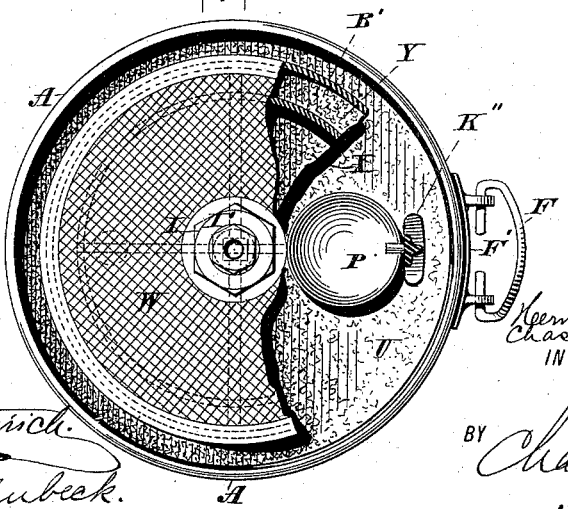
WITNESSES:
Gustav Dieterich.
John Kehlenbeck.
INVENTORS
Herman Mayer
Chas. G. F. Wahle
BY Chas. G. F. Wahle
ATTORNEY.

(No Model.) 2 Sheets—Sheet 2.
H. MAYER & C. G. F. WAHLE.
DISINFECTING APPARATUS.
No. 575,365. Patented Jan. 19, 1897.
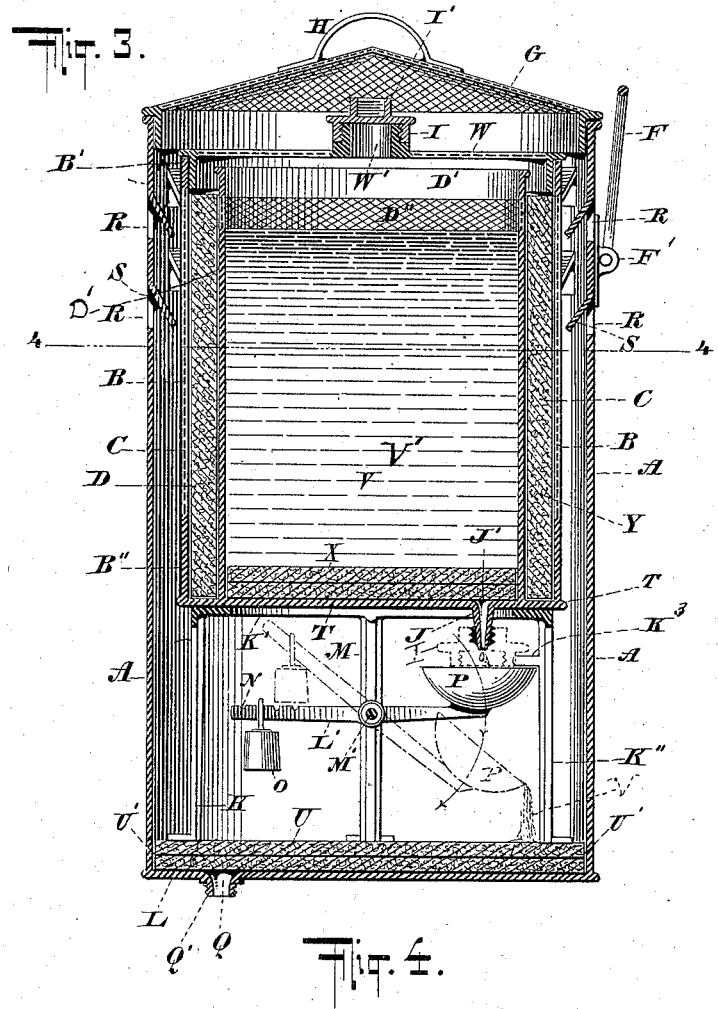
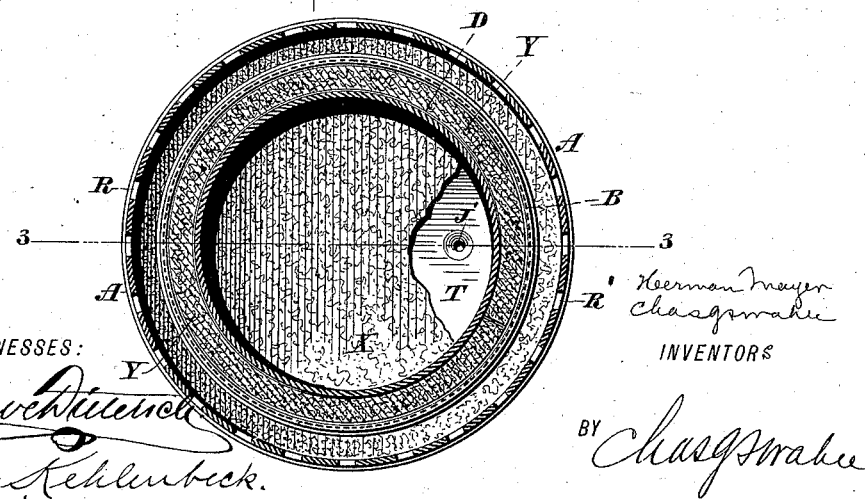
WITNESSES:
Gustave Dieterich
John Kehlenbeck.
INVENTORS
Herman Mayer
Chas. G. F. Wahle
BY Chas. G. Wahle
ATTORNEY.

UNITED STATES PATENT OFFICE.

HERMAN MAYER AND CHARLES G. F. WAHLE, OF NEW YORK, N. Y.

DISINFECTING APPARATUS.

SPECIFICATION forming part of Letters Patent No. 575,365, dated January 19, 1897.

Application filed August 24, 1896. Serial No. 603,673. (No model.)

*To all whom it may concern:*

Be it known that we, HERMAN MAYER and CHARLES G. F. WAHLE, of the city, county, and State of New York, have invented a certain new and useful Improvement in Disinfecting and Deodorizing Apparatus, of which the following is a specification and description.

The object of this invention is to provide a simple apparatus the component parts of which shall be separable, so that an apparatus may be constituted which can be placed in a sick-room for purposes of disinfection or when applied in combination of all its component parts is usable as an apparatus accurately and at stated intervals discharging disinfecting fluid into a cesspool or other area for disinfection.

In the accompanying drawings similar letters refer to corresponding parts in the various figures.

Figure 1 is a side view of the apparatus, partly showing interior arrangements. Fig. 2 is a sectional plan view of the apparatus. Fig. 3 is a central vertical sectional view on the line 3 3 of Fig. 4. Fig. 4 is a sectional plan view on the line 4 4 of Fig. 3.

The apparatus consists, primarily, of two compartments—viz., B the inner vessel and A the outer vessel.

To A is attached the netted or otherwise perforated cover G, having a handle H and the attaching device F, fastened to A to F'. This vessel A has perforations R, said perforations R being preferably made by so punching or stamping holes into A that the ledge S will be produced. Through the bottom L of said vessel A is the opening Q, discharging into the nozzle or pipe Q'. Over the bottom L of the vessel A and lying over the opening Q are placed layers of felt or other material possessing similar properties, (marked U.) B is the interior vessel, to which are fastened the supports K K' K'', of which supports K K'' rest upon the felt U in said vessel A.

The vessel B has an exterior wall composed of netting or other perforated material C and solid bands of material B' B'', Fig. 1. Through the bottom T of said vessel B is an opening J', discharging into a conical nozzle-pipe J. In said vessel B, by means of the wall D, placed some distance from the wall B' C B'' and running from the bottom T of the vessel B up to a short distance from the top of said vessel B, a chamber V' is created. Said wall D is composed of the solid part D' and a netted or perforated part D''. In the bottom of the chamber V', thus created by the space inclosed by said walls D, and over the opening J are placed layers of felt, or material having similar properties, X.

W is a cover closing the top of the vessel B. In said cover W is an opening W', through which disinfecting material V is poured into the chamber V'. When not in use, the opening W' is closed by the cover I, having a plug I' so formed as to be usable to close the nozzle J when it is desired to open W' and close J, as shown in dotted lines, Fig. 3.

In the compartment between the walls B', C, B'', and D felt, or material having similar property, Y, is placed, reaching from the top of the netting D'' to the bottom T.

The supports K K'' are of such height as to permit the following mechanism to be placed between the arm K' and the felt U.

L' is a lever pivoted at M' on the support M. On one arm of said lever L' is a weight O, adjustable on the notches N. P is a receiving-basin weighing less than the weight O, placed in the other arm of the lever L', held in position when empty by the lug K³ on the support K''.

The operation of the apparatus is as follows: When used as a machine to distribute disinfecting fluid, sufficient of the said fluid V, after raising the cover G, is poured through the opening W' into the chamber V', formed by the wall D, to pass the netted portion D''. The felt Y will absorb a portion of this fluid V through the netted portion D''. As a result of this absorption the disinfecting odor will escape through the netting C and the openings R into the air. The fluid V will also percolate through the felt X into the opening J' through the pipe or nozzle J into the receiving-basin P. When a sufficient quantity of the liquid V has dripped into the basin P to overbalance the weight O, the equilibrium of the lever L' will be disturbed, the disinfecting fluid V will drop on the felt U and gradually drip through the same into an opening Q into the nozzle Q', to the cesspool or other place to be affected by the disinfecting fluid. In this manner by a proper adjustment of the weight O at stated intervals a given quantity of fluid can be discharged, and thus regularity in quantity and period of discharge obtained. The felt U will of course retain some of the fluid V, and the odors arising therefrom will enter the air through the apertures R in the lower part of the vessel A, and also by means of the section U' escape through the chamber above U' through the apertures R, being assisted therein by the ledges S, and any odors that pass by the ledges S will escape through the netting G. Similarly the vapors arising from the disinfectant absorbed by the felt Y, passing through the netting C, will escape through the perforations R and the netted top G. When now it is desired to deodorize the air, say in a sickroom, the inner vessel B can be lifted out of the vessel A, carrying with it the supports K K' K''. I, by means of the plug I', will close the nozzle J and thus prevent dripping. The opening W' will permit of evaporation of the liquid V, in addition to which the saturated felt Y will evaporate through the netting C, and thus a deodorizer for the sick-room is constituted.

While the arrangement here shown is by us considered preferable, we desire to cover by this patent all mechanical equivalents usable to obtain the result sought for.

Having thus fully described our invention, we claim as new and desire to secure by Letters Patent—

1. In a disinfecting and deodorizing apparatus the combination of a reservoir having a discharge-pipe, with a lever pivoted at its fulcrum, carrying on one arm an adjustable weight and on the other arm a receiving-pan, which said receiving-pan when empty, weighs less than said weight, a plug to keep said receiving-pan, when empty, in position beneath said discharge-pipe of said reservoir, and a discharge-pipe below said lever, substantially as and for the purposes herein set forth.

2. In a disinfecting and deodorizing apparatus a vessel B, having a wall consisting of the netted portion C between solid bands B' B'', an opening J' in the bottom T of said vessel B, opening into a discharge-pipe J, in combination with supports K, K', K'', said vessel B having a cover W, in which is an opening W' capable of being closed by the screw I, which screw I has a plug I' fitting the discharge-pipe J, said opening W' entering a chamber V' in said vessel B, which said chamber V' is formed by the wall D consisting of a solid portion D' having a perforated portion D'' near the top thereof, said wall D being placed some distance from the wall of the vessel B, all in combination with an absorbent Y so arranged that it will rest against the netted portion C and the netted portion D'' of the wall D and an absorbent X placed on the bottom T of said chamber V' over the opening J', substantially as and for the purposes described.

3. In a disinfecting and deodorizing apparatus a vessel A, containing a support M to which is attached a lever L' said lever L' carrying on one arm a weight O, adjustable on said arm, and carrying at the other arm a receiver P, said receiver P weighing less when empty than said weight O and so arranged as to maintain its equilibrium until said receiver P shall hold material sufficient in weight to overbalance said weight O, and provided with an aperture Q opening into a discharge-pipe Q' in the bottom L of said vessel A, an absorbent U placed over the bottom L, an aperture Q of said vessel A, with apertures R, a foraminated cover G, and a fastening device F, substantially as and for the purposes set forth herein.

4. A disinfecting and deodorizing apparatus consisting of a vessel A having a perforated cover G and a fastening device F, a bottom L in which is an aperture Q opening into a discharge-pipe Q' in which vessel A are apertures R, an absorbent U placed over the bottom L of said vessel A covering the aperture Q therein, a support M in said vessel A to which is attached a lever L' pivoted at M', said lever L' carrying on one arm a weight O adjustable thereon and carrying on the other arm a receiver P, said receiver P weighing, when empty, less than said weight O and so arranged as to maintain its equilibrium until said receiver P shall hold sufficient material in weight to overbalance said weight O, all in combination with an interior vessel B whose wall consists of a netted portion C, between solid bands B' B'', having a bottom T in which is an opening J' discharging into the pipe J, said vessel B being in combination with the supports K, K', K'' and having a cover W in which is an opening W', capable of being closed by a screw I which said screw I has a plug I' so made as to fit the discharge-nozzle J, said opening W' entering a chamber V' in said vessel B, which said vessel B, has a wall D composed of a solid portion D' and a perforated portion D'' near the top of said wall D, said wall D of said vessel B being placed some distance from the wall of the vessel A, all in combination with an absorbent Y so arranged that it will rest against the netted portion C and also the netted portion D'' of the wall D and an absorbent placed over the bottom T, and opening J' in said vessel B substantially as and for the purposes herein set forth.

HERMAN MAYER.
CHAS. G. F. WAHLE.

Witnesses:
DAVID J. GOLDSTEIN,
JACOB E. BAB.